US011883856B2

(12) United States Patent
Sadler et al.

(10) Patent No.: US 11,883,856 B2
(45) Date of Patent: Jan. 30, 2024

(54) MODULAR VENTILATED WORKSTATION TABLE

(71) Applicant: Upland Architects. Inc., Norton, MA (US)

(72) Inventors: Gary Sadler, North Attleboro, MA (US); Adam Rebello, Dartmouth, MA (US)

(73) Assignee: Salon Safe, LLC, Norton, MA (US)

( * ) Notice: Subject to any disclaimer, the term of this patent is extended or adjusted under 35 U.S.C. 154(b) by 226 days.

(21) Appl. No.: 17/323,064

(22) Filed: May 18, 2021

(65) Prior Publication Data

US 2021/0268559 A1 Sep. 2, 2021

Related U.S. Application Data

(63) Continuation-in-part of application No. 15/461,705, filed on Mar. 17, 2017, now Pat. No. 11,224,278.

(51) Int. Cl.
*B08B 15/00* (2006.01)
*A47B 3/00* (2006.01)

(52) U.S. Cl.
CPC .............. *B08B 15/002* (2013.01); *A47B 3/00* (2013.01); *A47B 2200/06* (2013.01)

(58) Field of Classification Search
CPC .... B08B 15/002; A47B 13/00; A47B 2200/06
USPC .......................................................... 454/49
See application file for complete search history.

(56) References Cited

U.S. PATENT DOCUMENTS

| | | | |
|---|---|---|---|
| 4,846,146 A | 7/1989 | Tucker et al. | |
| 5,562,286 A | 10/1996 | Brinket | |
| 6,444,002 B1 | 9/2002 | Mai | |
| 8,430,940 B2 | 4/2013 | Nguyen | |
| 2008/0216647 A1 * | 9/2008 | Phan | A61L 9/16 108/50.13 |
| 2009/0081936 A1 | 3/2009 | Luu | |
| 2014/0260362 A1 | 9/2014 | Jung | |
| 2015/0004895 A1 | 1/2015 | Hammers et al. | |

* cited by examiner

*Primary Examiner* — Allen R. B. Schult
(74) *Attorney, Agent, or Firm* — Hinckley, Allen & Snyder, LLP; Stephen Holmes

(57) ABSTRACT

A robust cleaning and ventilation system for a workstation such as an office workspace, employing table geometry to create high efficiency air exchange while providing a conditioned make-up air return that completes the full ventilation process. The workstation includes a modular implementation such that the necessary equipment is not a single custom bespoke installation and can be used universally.

3 Claims, 6 Drawing Sheets

MODULAR VENTILATED WORKSTATION TABLE

CROSS-REFERENCE TO RELATED APPLICATIONS

This application is a continuation-in-part of U.S. patent application Ser. No. 15/461,705, filed Mar. 17, 2017 which is related to and claims priority from earlier filed U.S. Provisional Patent Application No. 62/310,071, filed Mar. 18, 2016.

BACKGROUND OF THE INVENTION

The present invention relates to a ventilated workstation. In the context of this disclosure a workstation will be illustrated as a manicure or nail salon workstation. More specifically, the present invention relates to an improved nail salon workstation that includes integrated dust, debris and fume collection, VOC exhaust, and ventilation, as well as a modular design that allows multiple workstations to be installed in an adjoined manner. In other embodiments the workstation may include an office workstation or cubicle arrangement.

In the salon industry, it is common to carry out the treatment of nails at a nail salon workstation where a technician employs a convenient table top working area that allows the customer to rest their hands while the technician carries out a procedure on the nails, such as a manicure etc. In many of the procedures carried out on the nails, there is a need to grind or file the nails or a plastic overlay applied to the nails in order to shape them into the desired configuration. The grinding process creates dust from the nails that is harmful to the health, safety and welfare and is readily inhaled by the technician and/or customer. In addition, there are normally fumes, consisting of toluene, formaldehyde and acetone, that are created in the course of a manicure such as those emitted by acrylic materials that are applied to the finger nails. Such fumes have been proven harmful if inhaled by the technician or customer.

As a result, professional manicure salons are now required to install source capture systems per the International Mechanical code and other health codes to protect both employees and customers from exposure to manicure by-products. Successful control of by-products requires that the VOC fumes be captured from the work area at the source of application and exhausted.

Exhaust and filtration systems have been used as a means to mitigate solvents, in an attempt to comply with air quality regulations. However, exhaust and filtration systems do not comply with current safety regulations because they recirculate the fume laden air back to the workspace and end up mixing the fresh air with the contaminated air. They require diligence in maintenance, filtration changes and regular cleaning. Also, these small systems are not integrated with the manicure workstation and appear to interfere with or restrict the manicurist's work, they are noisy and they are cumbersome which generally leads to a reluctance to use them.

For example, some systems employ a hood over the workstation. However, the presence of a hood is a significant inhibitor to the close attention that is required for good quality manicure work, and the presence of a laboratory-style hood can discourage and drive away customers. Ultimately, the currently available systems and hoods all are undesirable because of their negative impact customers and on the manicurist trade. The clearest problem is the visual impact or fear factor caused by technical equipment on display and the lack of compliance with the various health and mechanical regulations. Manicurists strive to make their shops warm and inviting, rather than cold and technical. It would be desirable for a manicure workstation to minimize or eliminate signs of technical equipment in use. While the use of air cleaning equipment is environmentally helpful, the equipment should take advantage of existing support structure in the manicure salon to operate optimally with minimum imposition on the manicurist and customer.

There is therefore a need for a robust source capture ventilation system in a workstation, employing workspace geometry to create high efficiency in debris, fume and odor removal while supplying fresh air back into the space in an energy efficient manner. There is a further need for a robust source capture ventilation system in a workstation, employing table geometry to create high efficiency in debris and odor removal that provides a modular implementation such that the necessary equipment is not a single custom bespoke installation and can be used universally. There is still a further need for a robust source capture ventilation system in a workstation, employing workspace geometry to create high efficiency in debris and odor removal that collects the particulate debris while venting the harmful fumes outside the work area while also bringing in fresh outdoor make-up air.

BRIEF SUMMARY OF THE INVENTION

In accordance with the present invention, in one embodiment a modular manicure ventilation station is provided that employs the station geometry to create high efficiency debris and VOC removal and simultaneous delivery of fresh, preconditioned make-up air. The station may be of pre-existing or typical design in which it is formed of one or more substantially vertical support pedestals and a substantially horizontal manicure work surface that positioned above the pedestals. An integrated air cleaning system operates on air flowing in a flow path having a slot inlet substantially surrounding the entire work surface on all sides. The slot inlet is positioned above a plenum that forms the space beneath the work surface to channel airflow into a manifold that runs along one side of the table and is in communication with the plenum beneath the work surface. An air duct having an inlet end and a discharge end is connected to the manifold where the inlet end communicates with the plenum and manifold leads laterally into the pedestal to a fan or other suitable collection device outside the work area.

It should be appreciated that while a manicure workstation is described, the teachings herein can apply to any workstation wherein VOC and other toxic fumes are generated such as for example soldering workstations, chemical workstations. Alternately, in an alternative embodiment this disclosure applies to indoor workspaces where proper ventilation and fresh air is required to provide a healthy working environment. Accordingly, the term workstation is meant to encompass any type of workstation and is not meant to be limited to manicure or salon type environments.

In one embodiment, as the table exhausts a volume of air, code requires that make-up air (not recirculated air) be provided to the space to maintain air pressure balance in the space. In this arrangement a return duct for makeup air is run concentric with the exhaust duct in a manner that facilitates energy transfer from the conditioned room air to the incoming make up air. This allows the make-up air to be brought into temperature equilibrium using the energy from the exhaust air as they exchange energy through the common duct walls or energy exchange plate.

A particle collector bag may be positioned in the airflow path. The collector may be in the slot inlets at the work surface. Further, the collector may be positioned at any location suitable and easily serviceable for cleaning and the like.

The flow path is contoured with relative cross-sectional areas to establish, in use, relatively high air flow velocity through the duct to produce a high rate of debris removal from the work surface and to establish relatively low air flow velocity through the particle collector bag and filter bed to produce high removal rate of particles and odors in these elements.

The manifold at the end opposite the air duct may be plugged to prevent air leakage. Similarly, the manifold plug may be removed to allow the connection to another workstation such that a plurality of such workstations can be connected together in series to a single airflow fan source. The various components of the present air exchange system fit into a space positioned outside the work area in a hidden manner such that the overall workstation remains neat and uncluttered and the system is sufficiently powerful that fumes and nail dust created at the working area where the nail procedure is being carried out on the customer are effectively removed and yet the present vacuum system is located in an area outside the workspace so that it is quiet and does not disturb the surrounding area.

Accordingly, it is an object of the present invention to provide a robust cleaning system in a workstation, employing workspace geometry to create high efficiency in air exchange, debris and odor removal. It is a further object of the present invention to provide a robust cleaning system in a workstation, employing workspace geometry to create high efficiency air exchange, debris and odor removal that provides a modular implementation such that the necessary equipment is not a single custom bespoke installation and can be used universally. It is a further object of the present invention to provide a robust cleaning system in a workstation, employing workspace geometry to create high efficiency in debris and odor removal that collects the particulate debris while venting the harmful fumes outside the work area.

BRIEF DESCRIPTION OF THE DRAWINGS

In the drawings which illustrate the best mode presently contemplated for carrying out the present invention.

DETAILED DESCRIPTION OF THE INVENTION

Figure 1:
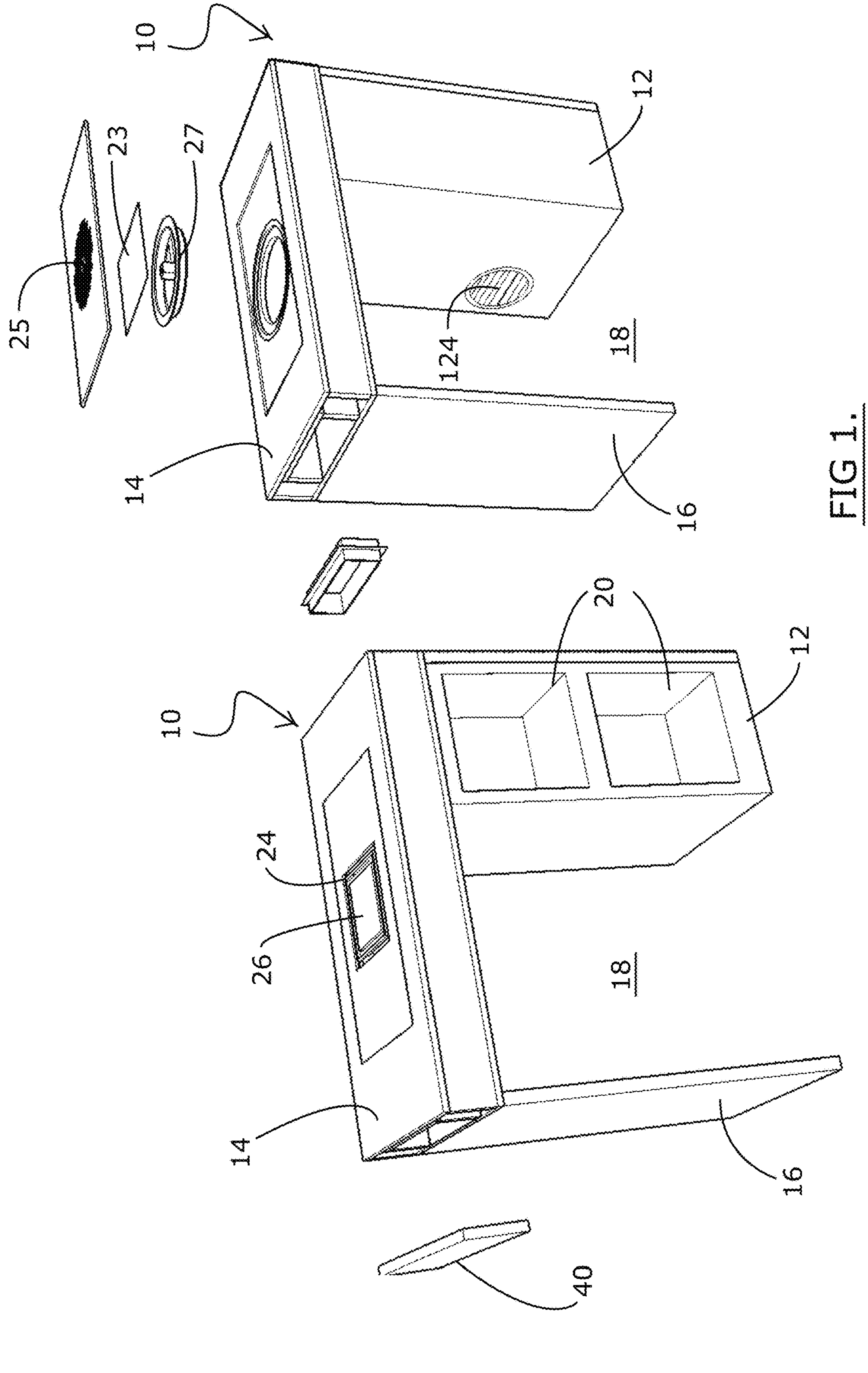
FIG. 1 is a front perspective view of a manicure workstation in accordance with one embodiment of the present disclosure.
Figure 2:
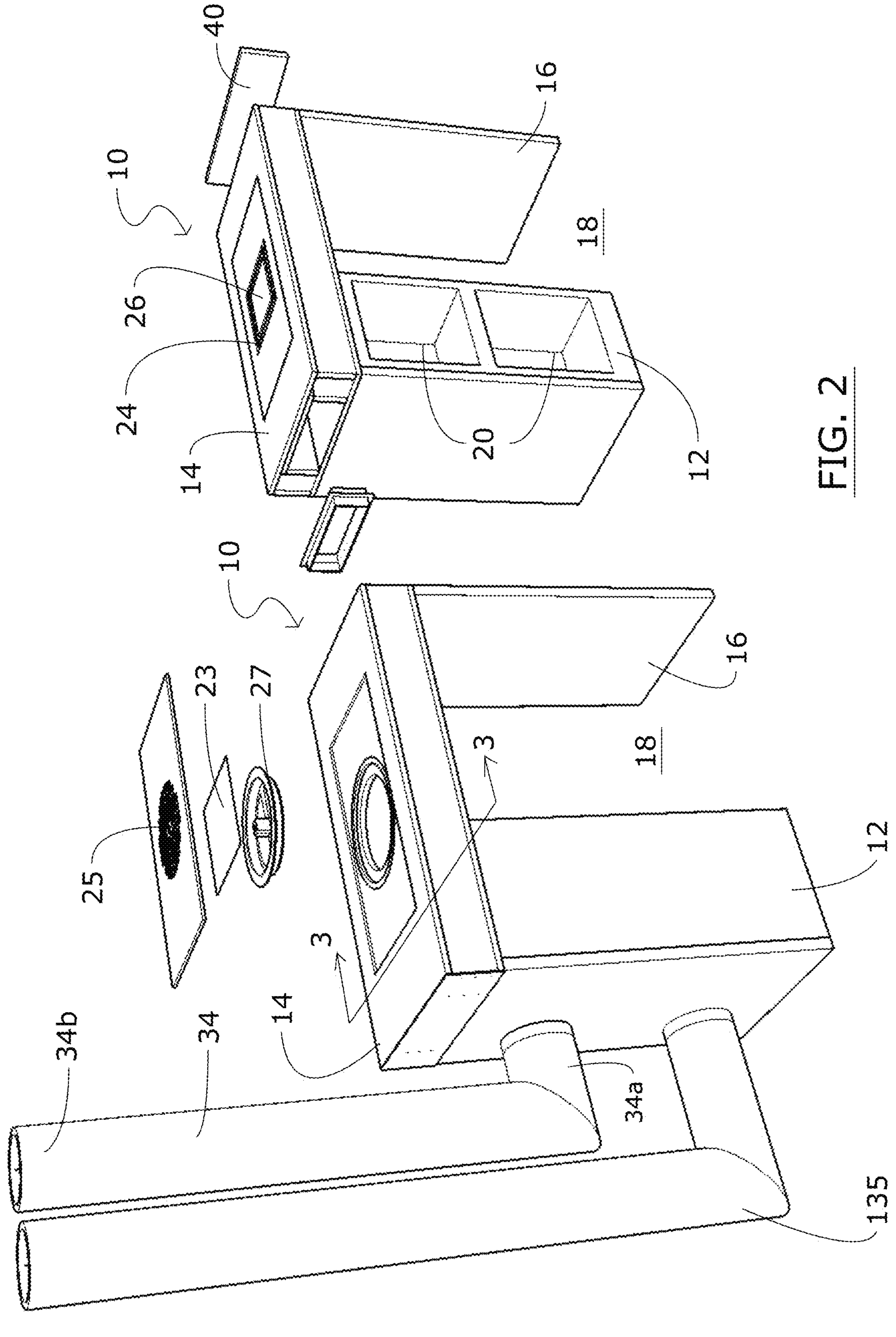
FIG. 2 is a rear perspective view of a manicure workstation in accordance with one embodiment of the present disclosure.

Now referring to the drawings, a modular manicure station is shown and generally illustrated in the figures. As can be seen at FIGS. 1 and 2, a modular manicure station 10 generally includes a base or pedestal 12, positioned beneath and supporting an upper work surface 14. The base or pedestal 12 may be formed in any manner known in the art and has the primary purpose of supporting the work surface 14. The base or pedestal 12 may be positioned centrally beneath the work surface 14 or offset to one side as is depicted in the drawing figures.

It should be appreciated that while a manicure workstation is described, the teachings herein can apply to any workstation wherein VOC and other toxic fumes are generated such as for example soldering workstations, chemical workstations. Accordingly, the term workstation is meant to encompass any type workstation and is not meant to be limited to manicure or salon type environments.

The base 12 may work in conjunction with an end panel 16 such that the base 12 is at one end of the manicure station 10 while an additional support end panel 16, leg or legs is provided at the opposing end of the manicure station 10, thereby supporting the work surface 14 therebetween. A space 18 is provided beneath the work surface 14 to allow a person seated at the manicure station 10 to position their knees therebeneath such that their hands will rest comfortably on the upper surface of the work surface 14 for the manicure procedure. The base or pedestal 12 may include compartments 20, shelves or drawers therein to allow storage of the technician's belongings, tools and supplies as well as providing space to display manicure products and other salon products that may be offered for sale.

In a preferred embodiment, the modular manicure station 10 is provided with an upper work surface 14 that is configured to create a high efficiency debris and odor removal system. As will be described in further detail below, the upper work surface 14 includes an integrated air cleaning system that operates on air flowing in a flow path having an inlet 24 within the upper work surface 14. More preferably, the upper work surface 14 has a slot inlet 24 that surrounds the periphery of the work area 26 along all of its sides. Alternately the upper work surface may have a grated inlet 25 that forms the entire work area. Beneath the inlet slot 24 or grate 25 may be provided a damper or baffle 27 to control and/or balance the airflow volume and velocity at the inlet.

Figure 3:
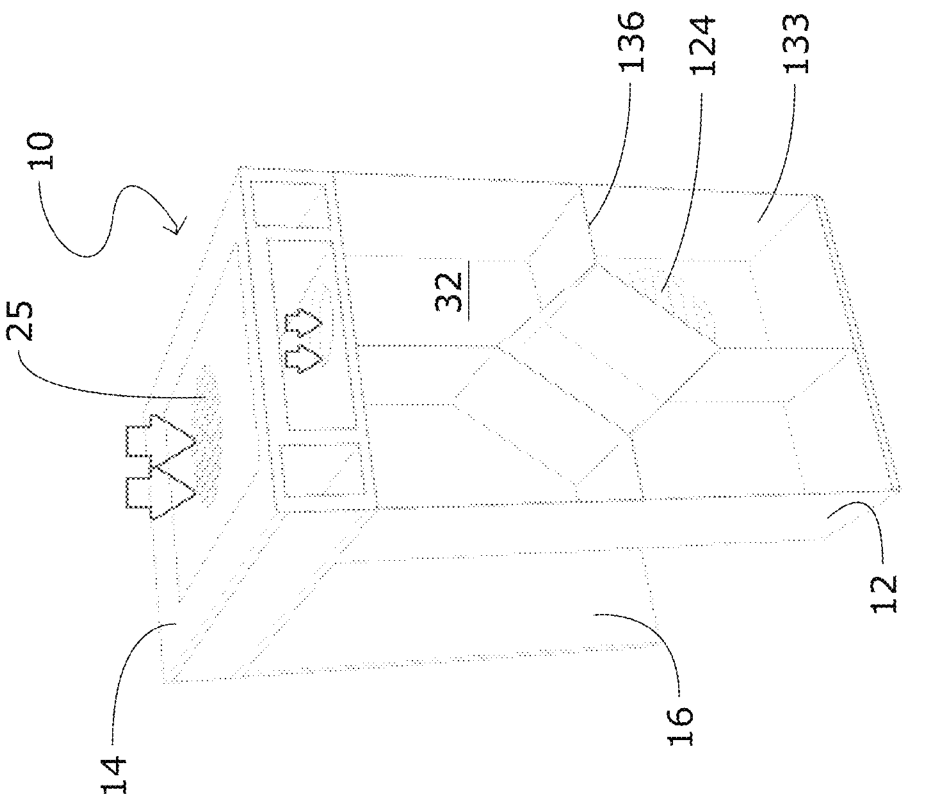
FIG. 3 is a cross sectional view taken along line 3-3 of FIG. 2.

Turning now to FIG. 3, the slot inlet 24 is positioned above a plenum 30 contained within the upper work surface 14. The plenum 30 forms the space beneath the work area 26 to collect all of the air that flows downwardly and inwardly from the slot inlet 24 or grate inlet 25. The plenum 30 is in fluid communication with a manifold 32 such that the plenum 30 channels airflow into the manifold 32 that is shown running along one side of the manicure station 10. Alternately, the manifold 32 may be positioned centrally under the upper work surface 14, or along a left or right end of the work surface 14 and still fall within the scope of the intended disclosure. An air duct 34 having an inlet end 34*a* and a discharge end 34*b* is connected to the manifold 32 where the inlet end 34*a* is in fluid communication with the plenum 30 and manifold 32 and leads laterally from the plenum 30 to a fan 36 or other suitable collection, filtration of exhaust device outside the work area. Still more preferably, the collected air is discharged to an exterior of the workspace within which the manicure station is contained to prevent any accumulation of VOC on the interior of the enclosed space.

A particle collector bag or filter 23 may be positioned in the airflow path. The collector may be in the slot inlets 24 at the work area 26. Further the, particle collector 23*a* may be positioned at any location suitable and easily serviceable for cleaning and the like. Similarly, the bag or filter may include filtration media that is intended to serve as a means from scrubbing the various evaporated solvent fumes and other airborne VOC from the airflow prior to the discharge of the air to the exterior of the workspace.

The flow path, illustrated at FIG. 3, wherein the air is drawn inwardly through the slot inlets through the plenum, into the manifold and out the air duct is contoured with relative cross-sectional areas to establish, in use, relatively high air flow velocity through the duct to produce a high rate of debris removal from the work surface and to establish relatively low air flow velocity through the particle collector bag and filter bed to produce high removal rate of particles and odors in these elements.

Figure 4:
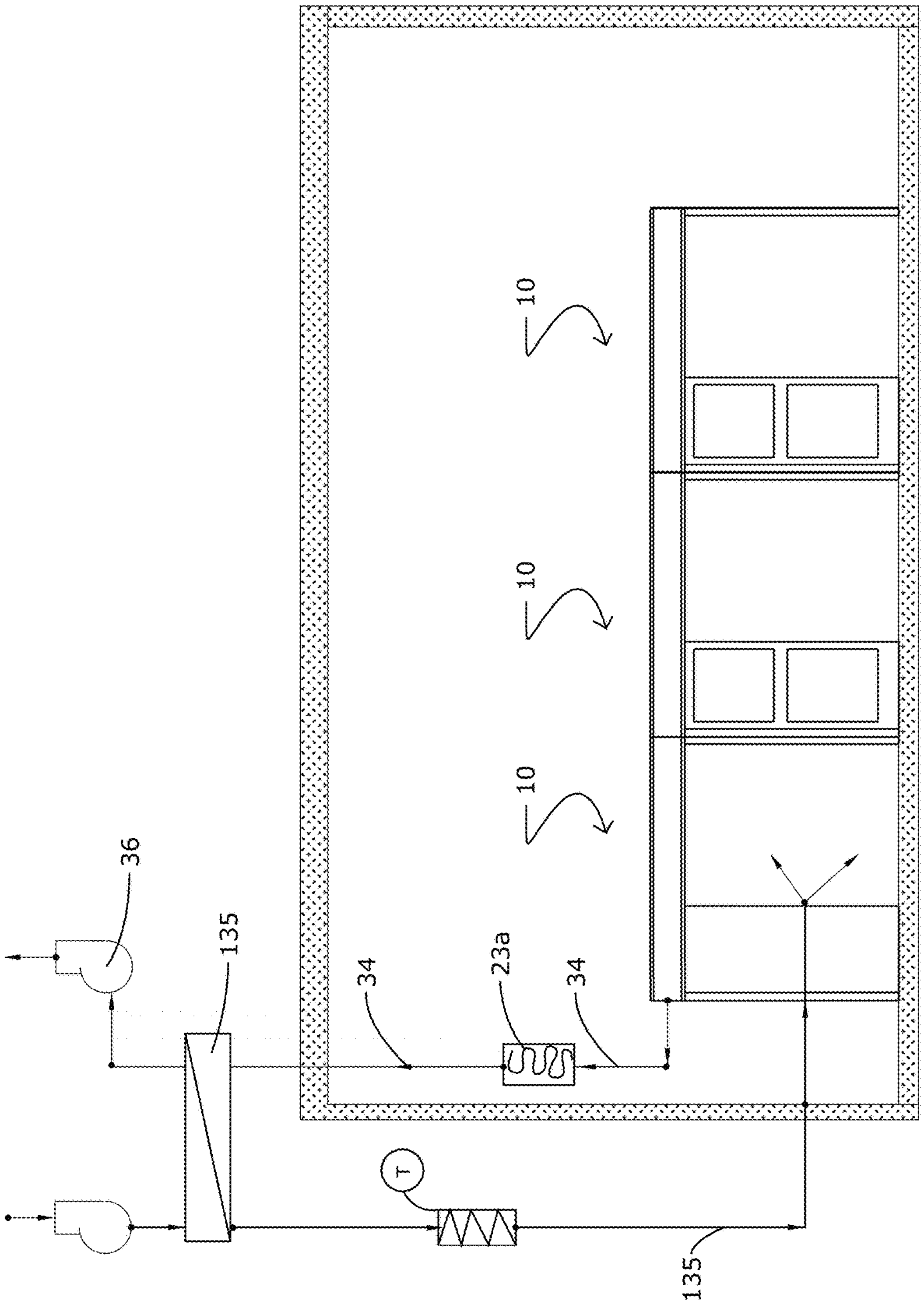
FIG. 4 is a schematic view of the system of the present disclosure.

As depicted at FIG. 4, the manifold at the end opposite the air duct may be plugged using a plug 40 to prevent air leakage. Similarly, the manifold plug 40 may be removed to allow the connection to another workstation such that a plurality of such workstations can be connected together in series to a single airflow fan source. The various components of the present air ventilation system fit into a space positioned outside the work area in a hidden manner such that the overall workstation remains neat and uncluttered and the system is sufficiently powerful that fumes and nail dust created at the working area where the nail procedure is being carried out on the customer are effectively removed and yet the present ventilation system is located in an area outside the workspace so that it is quiet and does not disturb the surrounding area.

In one embodiment, as the manicure station 10 exhausts a volume of air, code requires that make-up air be provided to the space to maintain air pressure balance in the space. In this arrangement a return air duct 135 for makeup air is run concentric with the exhaust duct 34 in a manner that facilitates energy transfer from the conditioned room air to the incoming make up air. There can be seen a return manifold 133 adjacent the exhaust manifold 32 such that they share a common side. Preferably this side is configured and arranged to facilitate energy transfer via a energy transfer plate 136 that allows energy to be captured from the conditioned air being exhausted and transferred to the incoming makeup air. One skilled in the art can appreciated that this process may be a energying or cooling of the incoming make up air as the environmental conditions require. This allows the make-up air to be brought into temperature equilibrium using the energy from the exhaust air as they exchange energy through the common duct walls or energy exchange plate. Alternately the energy exchange bay be done using a remote energy exchange unit 146. The make-up air is then discharged into the space via a make-up air diffuser 124 positioned on the make-up air manifold 133.

Figure 5:
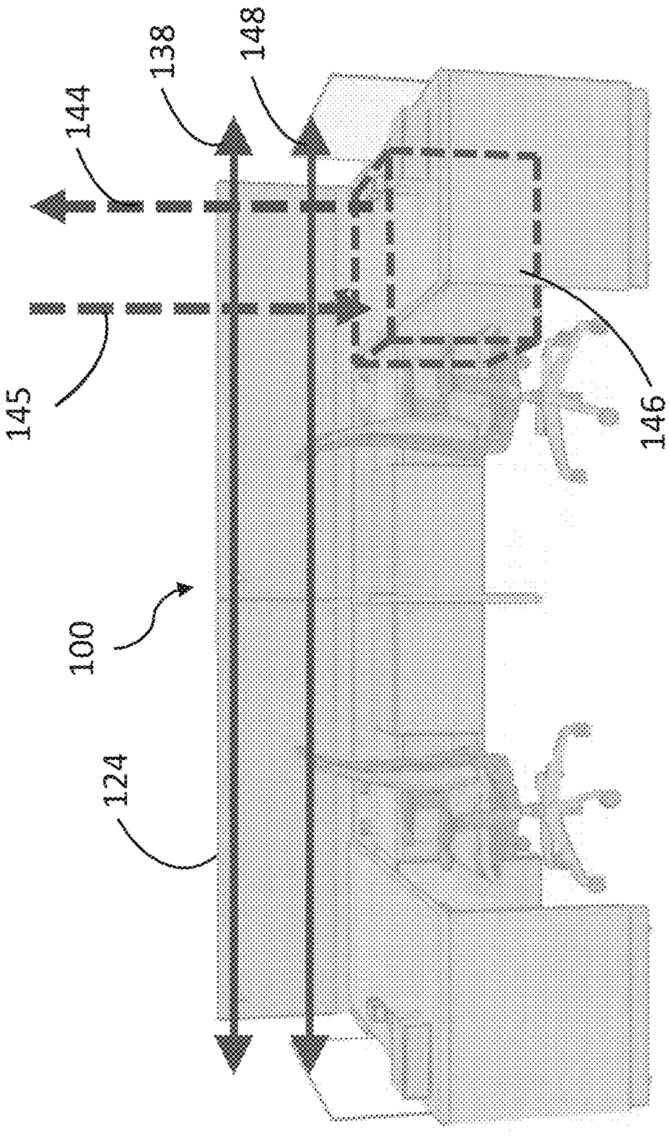
FIG. 5 is a front perspective view of a modular workstation in accordance with an alternate embodiment of the present disclosure.
Figure 7:
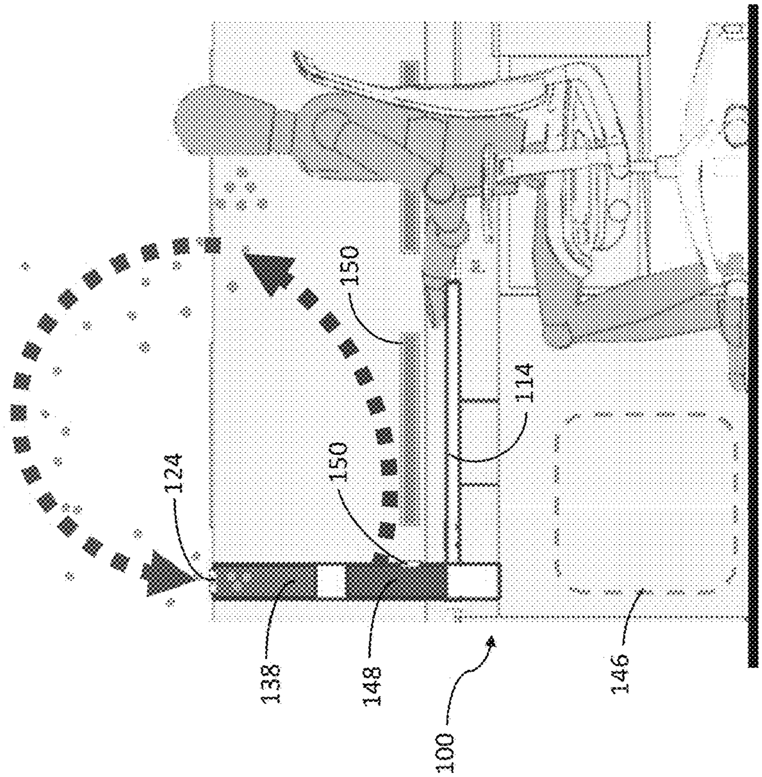
FIG. 7 is a cross-sectional view of a modular workstation in accordance with an alternate embodiment of the present disclosure.
Figure 6:
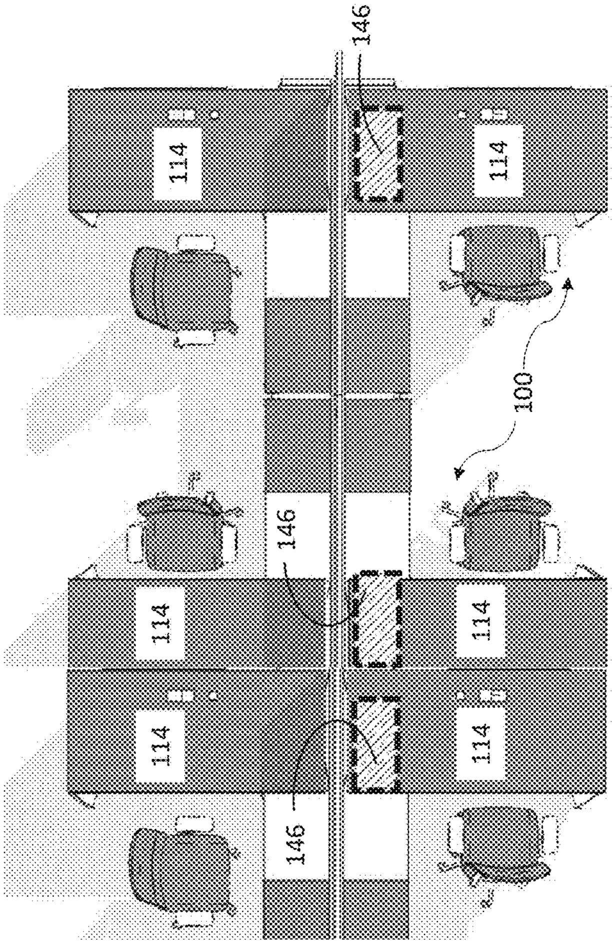
FIG. 6 is a top plan view of a modular workstation in accordance with an alternate embodiment of the present disclosure.

In the alternate embodiment illustrated at FIGS. 5-7, a modular vented workstation 100 is provided in a position above and adjacent to an upper work surface 114 that is configured to create a high efficiency air ventilation. As will be described in further detail below, the modular vented workstation 100 includes an integrated air cleaning system that operates on air flowing in a flow path having an inlet 124 positioned above the upper work surface 114. The slot inlet 124 is positioned above a plenum 138 contained within the modular vented workstation 100. The plenum 138 runs laterally to collect all of the air that flows downwardly and inwardly from the slot inlet 124. An air duct 144 having an inlet end and a discharge end is connected to the plenum 138 and leads laterally from the plenum 138 to a fan 146 or other suitable collection, filtration or exhaust device outside the work area. Still more preferably, the collected air is discharged to an exterior of the workspace within which the workstation is contained to prevent any accumulation of contaminated air on the interior of the enclosed space.

An air flow path is illustrated, wherein the air is drawn inwardly through the slot inlets through the manifold and out the air duct is contoured with relative cross-sectional areas to establish, in use, relatively high air flow through the duct to produce a high rate of air exchange from the work surface. While the workstation 100 exhausts a volume of air, code requires that make-up air be provided to the space to maintain air pressure balance in the space. In this arrangement a return air duct 145 for makeup air is run adjacent the exhaust duct 144 in a manner that facilitates energy transfer from the conditioned room air to the incoming make up air. There can be seen a return manifold 145 adjacent the exhaust manifold 144 in a energy recovery ventilator unit including the fan 146 such that they share a common side. Preferably this side is configured and arranged to facilitate energy transfer via a energy transfer plate, as described above, that allows energy to be captured from the conditioned air being exhausted and transferred to the incoming makeup air. One skilled in the art can appreciated that this process may be a energying or cooling of the incoming make up air as the environmental conditions require. This allows the make-up air to be brought into temperature equilibrium using the energy from the exhaust air as they exchange energy through the common duct walls or energy exchange plate. Alternately the energy exchange bay be done using a remote energy exchange unit. The make-up air is then discharged into the space via a make-up air plenum 148 via make up air diffuser 150 positioned adjacent the workstation surface 114.

It can therefore be seen that the present disclosure provides a robust cleaning and ventilation system in a workstation, employing a linear based geometry to create high efficiency in air exchange while providing a conditioned make-up air return that completes the full ventilation process. It can be further seen that the present disclosure provides a robust cleaning and ventilation system in a manicure table, employing table geometry to create high efficiency in debris and odor removal that includes a modular implementation such that the necessary equipment is not a single custom bespoke installation and can be used universally. For these reasons, the present disclosure is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:

1. A modular ventilated workstation arrangement, comprising:

a first workstation comprising:

a first base;

a first work surface on a horizontal portion of said first base;

a first intake plenum in a vertical portion of said first base and extending from a first end of the first base to a second end of the first base and having a plenum opening at each end;

an intake vent in the vertical portion of the first base above said first work surface, said intake vent in fluid communication with said first intake plenum;

a first make up air plenum in said vertical portion of said first base and extending from the first end of the first base to the second end of the first base and having a plenum opening at each end said first make up air plenum having a make up air diffuser adjacent said first work surface;

a first ventilator unit in the first base including a fan and being in fluid communication with said first intake plenum and said first make up air plenum;

an exhaust duct in fluid communication with the first ventilator unit, wherein air flows into said intake vent through to said first intake plenum and said first ventilator unit and exits through said exhaust duct;

a make up air duct in fluid communication with the first ventilator unit, wherein make up air flows into the make up air duct through to the first ventilator unit and exits the first make up air plenum to ambient environment;

a second workstation comprising:

a second base;

a second work surface on a horizontal portion of said second base;

a second intake plenum in a vertical portion of said second base and extending from a first end of the second base to a second end of the second base and having a plenum opening at each end, wherein said first and second intake plenums of said first and second workstations are in fluid communication when said first and second workstations are interconnected in adjacent end to end relation;

an intake vent in the vertical portion of said second base adjacent to said second work surface, said intake vent in fluid communication with said second intake plenum;

a second make up air plenum in said vertical portion of said second base and extending from the first end of the second base to the second end of the second base and having a plenum opening at each end said second make up air plenum having a make up air diffuser adjacent said second work surface;

a second ventilator unit in the second base including a fan and being in fluid communication with said second intake plenum and said second make up air plenum; and plenum end plugs blocking the plenum openings on exposed ends of the interconnected workstations.

2. The modular ventilated workstation arrangement of claim 1 wherein said first ventilator unit comprises an energy recovery ventilator unit having a heat exchanger to exchange energy between said make up air and said exhaust air.

3. The modular ventilated workstation arrangement of claim 1 wherein the first and second make up air plenums are located in said vertically oriented portions of said first and second bases below said first and second intake plenums.

* * * * *